US012645318B1

(12) United States Patent
Lin et al.

(10) Patent No.: US 12,645,318 B1
(45) Date of Patent: Jun. 2, 2026

(54) ENABLING A TOUCH FUNCTION ROW TO WAKE A SYSTEM BASED ON AN ACCELEROMETER TAP ALGORITHM

(71) Applicant: DELL PRODUCTS L.P., Round Rock, TX (US)

(72) Inventors: Yung-Sheng Lin, Taoyuan City (TW); Shun-Tang Hsu, Taipei (TW); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/037,068

(22) Filed: Jan. 24, 2025

(51) Int. Cl.
*G06F 3/041* (2006.01)
*G06F 1/16* (2006.01)
*G06F 9/4401* (2018.01)

(52) U.S. Cl.
CPC .......... *G06F 3/04144* (2019.05); *G06F 1/169* (2013.01); *G06F 9/4418* (2013.01); *G06F 2200/1636* (2013.01)

(58) Field of Classification Search
CPC .... G06F 3/04144; G06F 1/169; G06F 9/4418; G06F 2200/1636
See application file for complete search history.

(56) References Cited

U.S. PATENT DOCUMENTS

| 9,977,530 B2 | 5/2018 | Roberts-Hoffman |
| 12,079,413 B2 | 9/2024 | Lin et al. |
| 2017/0168631 A1* | 6/2017 | Roberts-Hoffman ....................... G06F 3/04883 |

* cited by examiner

*Primary Examiner* — Jonathan A Boyd
(74) *Attorney, Agent, or Firm* — Larson Newman, LLP

(57) ABSTRACT

An information handling system includes a cover and a case bottom. The cover includes a first accelerometer and the case bottom includes a second accelerometer. The information handling system detects a tap event on one of the first accelerometer or the second accelerometer, determines whether the tap event is detected on the first accelerometer or the second accelerometer, and wakes the information handling system when the tap event is detected on the first accelerometer.

20 Claims, 3 Drawing Sheets

ENABLING A TOUCH FUNCTION ROW TO WAKE A SYSTEM BASED ON AN ACCELEROMETER TAP ALGORITHM

FIELD OF THE DISCLOSURE

This disclosure relates to information handling systems, and more particularly relates to enabling a touch function row and waking a system based on an accelerometer algorithm.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a cover and a case bottom. The cover may include a first accelerometer and the case bottom may include a second accelerometer. The information handling system may detect a tap event on one of the first accelerometer or the second accelerometer, determine whether the tap event is detected on the first accelerometer or the second accelerometer, and wake the information handling system when the tap event is detected on the first accelerometer.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1A-1E illustrate an information handling system 100. Information handling system 100 represents a 2-in-1 laptop computer that combines the functions of a traditional laptop computer with the functions of a tablet device. In this regard, the 2-in-1 laptop computer has the keyboard and touch pad on a bottom case of the traditional laptop computer, and the touch pad display of the tablet device on a cover of the laptop computer. Further, 2-in-1 laptop computer has a hinge mechanism between the bottom case and the cover that permits the 360 degree rotation between the bottom case and the cover.

Figures 1A, 1B, 1C, 1D, 1E:
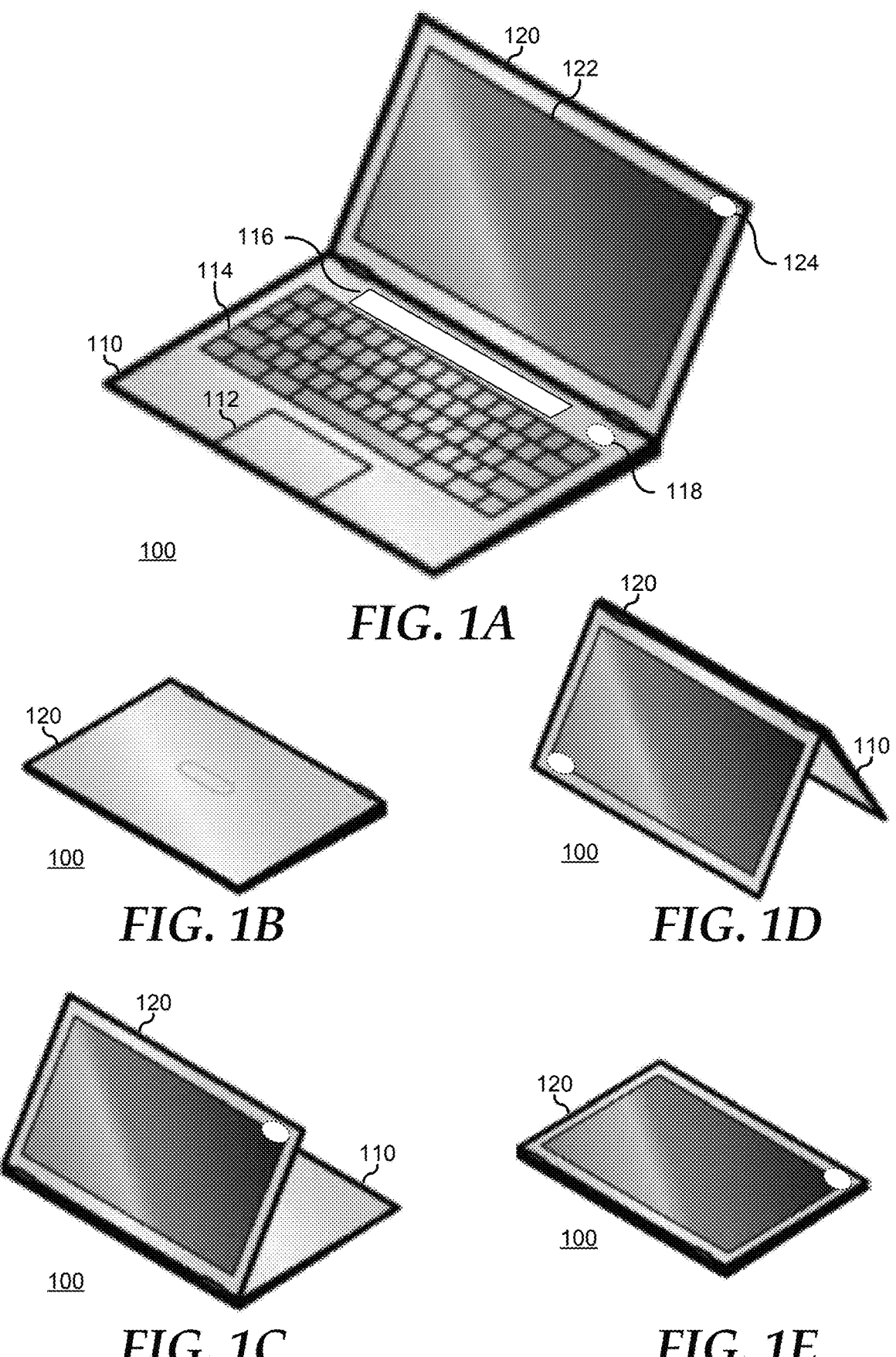
FIGS. 1A-1E illustrate an information handling system such as a 2-in-1 laptop computer in various configurations according to an embodiment of the present disclosure.

FIG. 1A illustrates information handling system 100 arranged as the traditional laptop computer. Here, information handling system 100 is illustrated as including a bottom case 110 and a cover 120. Bottom case 110 includes a touch pad 112, a keyboard 114, a touch function row 116, and an accelerometer 118. Touch function row 116 will be described further below. Accelerometer 118 is illustrated with dashed lines, indicating that the accelerometer will typically be located within bottom case 110, and hence will be hidden from exterior view. Cover 120 includes a touch panel display 122 and an accelerometer 124. Accelerometer 124 is illustrated with dashed lines, indicating that the accelerometer will typically be located within cover 120, and hence will be hidden from exterior view. Information handling system 100 further includes a power switch, typically located on bottom case 110, and commonly provided as a particular key of keyboard 114. In the laptop arrangement, a user may interact with information handling system 100 as with a traditional laptop computer (i.e., via touch pad 112 and keyboard 114), via the touch panel functions of touch panel display 120, or both. Further, bottom case 110 and cover 120 are typically arranged such that the hinge has an obtuse angle, typically in the range of 90-135 degrees.

FIG. 1B illustrates information handling system 100 in a closed arrangement with cover 120 closed to bottom case 110. That is, bottom case 110 and cover 120 are arranged such that the hinge has a zero (0) degree angle. This arrangement is typically associated with a state where information handling system 100 is powered off, in a sleep state, a standby state, a modern standby state, or the like. However, it will be understood that information handling system 100 may also be configured to be connected to external human interface devices (HIDs), such as a stand-alone monitor and a wireless keyboard/mouse, to external storage devices, to a docking station, or the like. As such, in the closed arrangement, information handling system 100 may be fully powered on, or in a sleep state, a standby state, a modern standby state, or the like, with the connected devices operating accordingly.

FIG. 1C illustrates information handling system 100 in a display arrangement. Here, bottom case 110 and cover 120 are arranged such that the hinge has an angle greater than 270 degrees, typically in the range of 270-315 degrees. In this arrangement, bottom case 110 acts as a stand for cover 120 and the user may interact with information handling system 100 via the touch panel functions of touch panel device 122 only. This is because touch pad 112 and keyboard 114 will be understood to be facing downward and to be adjacent to the surface upon which information handling system 100 is placed.

FIG. 1D illustrates information handling system 100 in a tent arrangement, where bottom case 110 and cover 120 are arranged similarly to the display arrangement shown above. Here, bottom case 110 and cover 120 are arranged such that the hinge has an angle greater than 270 degrees, but the angle will typically be greater than 315 degrees. In this arrangement, bottom case 110 also acts as a stand for cover 120 and the user may interact with information handling system 100 via the touch panel functions of touch panel display 122. However, in the tent arrangement, information handling system 100 is flipped over as compared to the display arrangement described above, and the display functions of the touch panel display are inverted. Note that touch pad 112 and keyboard 114 are located on a back side of bottom case 110 in the tent arrangement, and hence are typically inaccessible to the user of information handling system.

FIG. 1E illustrates information handling system 100 in a tablet arrangement where bottom case 110 and cover 120 are hinged at a 360 degree angle. In the tablet arrangement the user may interact with information handling system 100 via the touch panel functions of touch panel display 122, with touch pad 112 and keyboard 114 located on a bottom side of information handling system 100. In this arrangement, the user typically holds information handling system 100.

Touch function row 116 represents a small touch pad type device located at the top of keyboard 114 that provides directed functionality, such as function key functionality, hot key functionality, or the like. For example, a user can provide a tap action at a particular location on touch function row 116 to activate a predetermined function, or can press and hold on that particular location to activate a second predetermined function, as needed or desired. The tap-based functions may be dedicated to media controls, such as volume, pause/play, display brightness, or the like, and the tap-and-hold-based functions may be associated with the typical function keys as may typically be accessed by depressing a "function" key on keyboard 116 and simultaneously depressing a function key on the keyboard.

Accelerometers 118 and 124 are provided to give an indication as to the motion that information handling system 100 experiences, to detect impacts to the information handling system, or other motion-based indications, as needed or desired. In a particular embodiment, information handling system 100 may include one or more additional accelerometers located so as to be able to detect a location of an impact to the information handling system, for example by triangulating the times at which each accelerometer detects the impact. Further, because bottom case 110 and cover 120 are mechanically isolated from each other by the hinge between them, collocating accelerometer 118 in the bottom case and accelerometer 124 in the cover permits the localization of the impact to either the bottom case or the cover. Thus it will be understood that information handling system 100 will include a tap sensor algorithm to detect and determine the location and magnitude of an impact to the information handling system.

It has been understood by the inventors of the current disclosure that a task function row is not typically active when the system is in power down state, a standby state, a modern standby state, or the like, and thus a user cannot utilize the task function row to wake up the system. Instead, the user typically needs to depress a power button or a particular key of the keyboard in order to wake the system. However, in many arrangements of the 2-in-1 laptop computer, such as the closed arrangement, the display arrangement, the tent arrangement, or the tablet arrangement, the power button or the keyboard key is not readily accessible to the user because such button or key is not visible to the user.

In a particular embodiment, information handling system 100 operates to detect an impact event via accelerometers 119 and 124, and to determine whether or not the impact event is a tap. If the impact event is a tap event, then information handling system 100 further determines the location of the tap event. If the tap event is located proximate to touch function row 116, then information handling system 100 operates to turn on the touch function row. On the other hand, if the tap event is located on cover 120, then information handling system 100 operates to wake itself from a sleep state, a standby state, a modern standby state, or the like. In this case, a tap event on cover 120 maybe understood in the context of the arrangements of FIGS. 1B-1E, where the cover is visible to the user, but where bottom cover 110, and consequently the power button, are not visible to the user. In this way, cover 120 becomes a user-friendly interface to wake information handling system 100.

Figure 2:
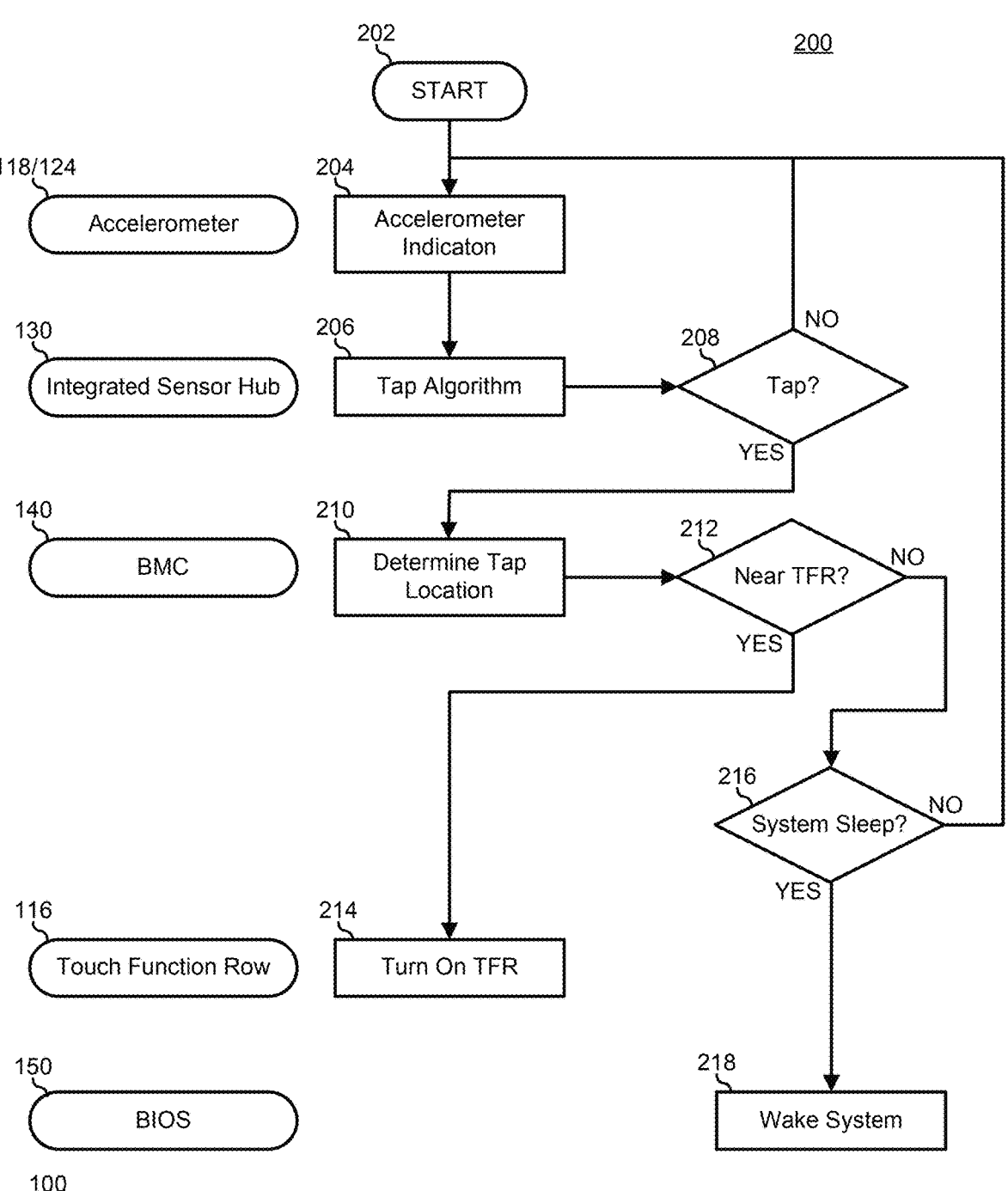
FIG. 2 illustrates the information handling system of FIG. 1 and a method for enabling a touch function row and waking the information handling system based on an accelerometer algorithm according to an embodiment of the present disclosure.

FIG. 2 illustrates information handling system 100, here illustrated as including touch function row 116, accelerometers 118 and 124, an integrated sensor hub (ISH) 130, a Baseboard Management Controller 140, and a Basic Input/Output System (BIOS) 150. ISH 130 represents a particular Original Equipment Manufacturer's (OEM's) hardware and firmware that can be utilized in information handling systems 100, such as an Intel-based sensor framework, an AMD-based sensor framework, a Qualcomm-based sensor framework, or another OEMs sensor framework, as needed or desired. in particular, ISH 130 includes functionality to instantiate a tap algorithm as described above. BMC 140 represents management hardware of information handling system 100 that operates out-of-band from a hosted environment instantiated on host hardware of the information handling system. BMC 140 provides for the monitoring, management, and maintenance of the hardware, functions, and features of information handling system 100. BIOS 150 represents code operable to detect resources within information handling system 100, to provide drivers for the resources, initialize the resources, and access the resources.

FIG. 2 further illustrates a method 200 for enabling a touch function row and waking the information handling system based on an accelerometer algorithm, starting at block 202. One of accelerometers 118 or 124 provides an indication of an impact event in block 204. The impact event is forwarded to ISH 130 and the ISH executes a tap algorithm in block 206 to determine whether the impact event is a tap event in decision block 208. If not, the "NO" branch of decision block 208 is taken and the method loops back to block 204 until a next impact event is detected by one of accelerometers 118 or 124. When the impact event is a tap event, the "YES" branch of decision block 208 is taken and the detection is forwarded to BMC 140 to determine the location of the tap event in block 210.

A decision is made as to whether or not the tap location is near the touch function row in decision block 212, If so, the "YES" branch of decision block 212 is taken and touch function row 116 is turned on in block 214. If the tap location is not near the touch function row, the "NO" branch of decision block 212 is taken and a decision is made as to whether or not information handling system 100 is in a sleep state in decision block 216. If not, the "NO" branch of decision block 326 is taken and the method loops back to block 204 until a next impact event is detected by one of accelerometers 118 or 124. If information handling system 100 is in a sleep state, the "YES" branch of decision block 218 is taken and BIOS 150 wakes the information handling system in block 218.

Figure 3:
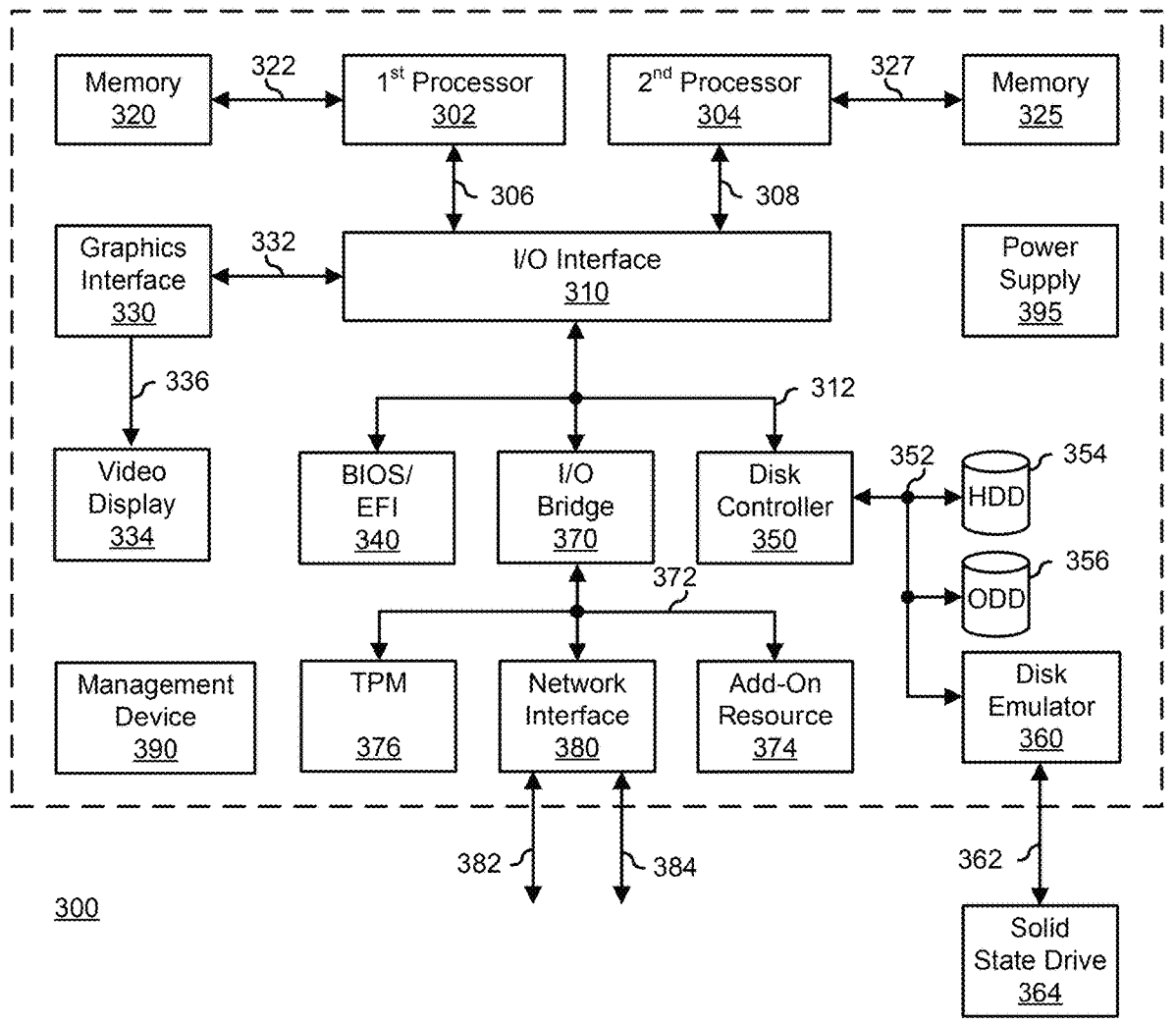
FIG. 3 is a block diagram illustrating a generalized information handling system according to another embodiment of the present disclosure.

FIG. 3 illustrates a generalized embodiment of an information handling system 300 similar to information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 where peripheral interface 372 and the I/O channel are of the same type, and the I/O bridge translates information from a format suitable to the I/O channel to a format suitable to the peripheral channel 372 where they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 where the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed:

1. An information handling system, comprising:
a cover including a first accelerometer;
a case bottom including a second accelerometer;
a touch pad in the case bottom; and
a touch function row in the case bottom, the touch function row being configured to activate predetermined functions of the information handling system based upon an input to the touch function row;
wherein the information handling system is configured to detect a tap event on one of the first accelerometer or the second accelerometer, determine a location of the tap event within one of the cover and the case bottom, wake the information handling system when the tap event is located within the cover, and turn on the touch function row when the tap event is located proximate to the touch function row.

2. The information handling system of claim 1, wherein, in detecting the tap event, the information handling system is further configured to detect an impact event on the one of the first accelerometer or the second accelerometer.

3. The information handling system of claim 2, wherein, in detecting the tap event, the information handling system is further configured to determine that the impact event is the tap event.

4. The information handling system of claim 3, wherein, in determining that the impact event is the tap event, the information handling system is further configured to execute a tap algorithm to distinguish a fall event from the tap event.

5. The information handling system of claim 1, wherein, in waking he information handling system, the information handling system is further configured to transition the information handling system from a low power operating mode to a high power operating mode.

6. The information handling system of claim 5, wherein the low power operating mode includes one of a sleep state, a standby state, and a modern standby state.

7. The information handling system of claim 1, wherein, in determining the location of the tap event, the information handling system is further configured to determine the location based upon a triangulation of a time at which the first accelerometer and the second accelerometer detects the tap event.

8. The information handling system of claim 1, wherein, in determining the location of the tap event, the information handling system is further configured to determine the location based upon a triangulation of a time at which the first accelerometer and the second accelerometer detects the tap event.

9. A method, comprising:

providing, on an information handling system, a cover including a first accelerometer;

providing, on the information handling system, a case bottom including a second accelerometer;

providing, in the case bottom, a touch pad device;

providing, in the case bottom, a touch function row configured to activate predetermined functions of the information handling system based upon an input to the touch function row;

detecting, by the information handling system, a tap event on one of the first accelerometer or the second accelerometer;

determining a location of the tap event within one of the cover and the case bottom;

waking the information handling system when the tap event is located within the cover; and turning on the touch function row when the tap event is located proximate to the touch function row.

10. The method of claim 9, wherein, in detecting the tap event, the method further comprises:

detecting an impact event on the one of the first accelerometer or the second accelerometer.

11. The method of claim 10, wherein, in detecting the tap event, the method further comprises:

determining that the impact event is the tap event.

12. The method of claim 11, wherein, in determining that the impact event is the tap event, the method further comprises:

executing a tap algorithm to distinguish a fall event from the tap event.

13. The method of claim 9, wherein, in waking he information handling system, the method further comprises:

transitioning the information handling system from a low power operating mode to a high power operating mode.

14. The method of claim 13, wherein the low power operating mode includes one of a sleep state, a standby state, and a modern standby state.

15. The method of claim 9, wherein, in determining the location of the tap event, the information handling system is further configured to determine the location based upon a triangulation of a time at which the first accelerometer and the second accelerometer detects the tap event.

16. An information handling system, comprising:

a cover including a first accelerometer;

a case bottom including a second accelerometer;

a touch pad device; and a touch function row configured to activate predetermined functions of the information handling system based upon an input to the touch function row wherein the information handling system is configured to detect a tap event on one of the first accelerometer or the second accelerometer, determine a location of the tap event is being detected on of the first accelerometer or the second accelerometer, wake the information handling system when the tap event is detected on the first accelerometer, and turn on the tap function row when the tap event is detected on the second accelerometer.

17. The information handling system of claim 16, wherein, in detecting the tap event, the information handling system is further configured to detect an impact event on the one of the first accelerometer or the second accelerometer.

18. The information handling system of claim 17, wherein, in detecting the tap event, the information handling system is further configured to determine that the impact event is the tap event.

19. The information handling system of claim 18, wherein, in determining that the impact event is the tap event, the information handling system is further configured to execute a tap algorithm to distinguish a fall event from the tap event.

20. The information handling system of claim 16, wherein, in waking he information handling system, the information handling system is further configured to transition the information handling system from a low power operating mode to a high power operating mode, wherein the low power operating mode includes one of a sleep state, a standby state, and a modern standby state.

* * * * *